United States Patent [19]
Larsen

[11] 4,027,267
[45] May 31, 1977

[54] METHOD OF DECODING DATA CONTENT OF F2F AND PHASE SHIFT ENCODED DATA STREAMS

[75] Inventor: Larry Donald Larsen, Raleigh, N.C.

[73] Assignee: International Business Machines Corporation, Armonk, N.Y.

[22] Filed: June 1, 1976

[21] Appl. No.: 691,739

[52] U.S. Cl. ............................... 329/106; 325/321; 328/119; 329/107; 340/167 R; 340/167 A

[51] Int. Cl.² .................... H03K 9/08; H03K 13/01

[58] Field of Search ................. 329/104, 106, 107; 325/38 R, 321, 349; 340/167 R, 167 A, 167 P; 328/119

[56] References Cited

UNITED STATES PATENTS

| | | | |
|---|---|---|---|
| 3,713,140 | 1/1973 | Meslener | 329/107 X |
| 3,902,129 | 8/1975 | Boothroyd | 329/107 |
| 3,982,195 | 9/1976 | Turner | 325/321 X |

Primary Examiner—Siegfried H. Grimm
Attorney, Agent, or Firm—Edward H. Duffield

[57] ABSTRACT

A method for reading or decoding the self clocking encoded data content of digital data bits encoded in the standard F2F or in phase shift format is described. The method is useful for decoding F2F or phase shift code signals presented in the form of optic, magnetic, or electric signal variations presented to a decoding apparatus for the extraction of data therefrom. The technique utilizes the measurement of the interval of time or distance elapsing between two like polarity signal transitions to determine the data content of that segment of the waveform bounded by the two similar polarity transitions. The data content of that portion of the waveform or signal stream is defined in accordance with a logical matrix of values corresponding to the F2F or phase shift code formats used.

8 Claims, 10 Drawing Figures

FIG. 2A

1 TO 1 TIME

|  | STATE I | STATE II |
|---|---|---|
| T | EMIT 1<br>REMAIN IN STATE I | EMIT 1<br>REMAIN IN STATE II |
| 1.5T | EMIT 01<br>GO TO STATE II | EMIT 0<br>GO TO STATE I |
| 2T | EMIT 00<br>REMAIN IN STATE I | ERROR |

FIG. 2B

1 TO 1 TIME

|  | STATE I | STATE II |
|---|---|---|
| T | EMIT 1<br>REMAIN IN STATE I | EMIT 1<br>REMAIN IN STATE II |
| 1.5T | EMIT 0<br>GO TO STATE II | EMIT 10<br>GO TO STATE I |
| 2T | EMIT 00<br>REMAIN IN STATE I | ERROR |

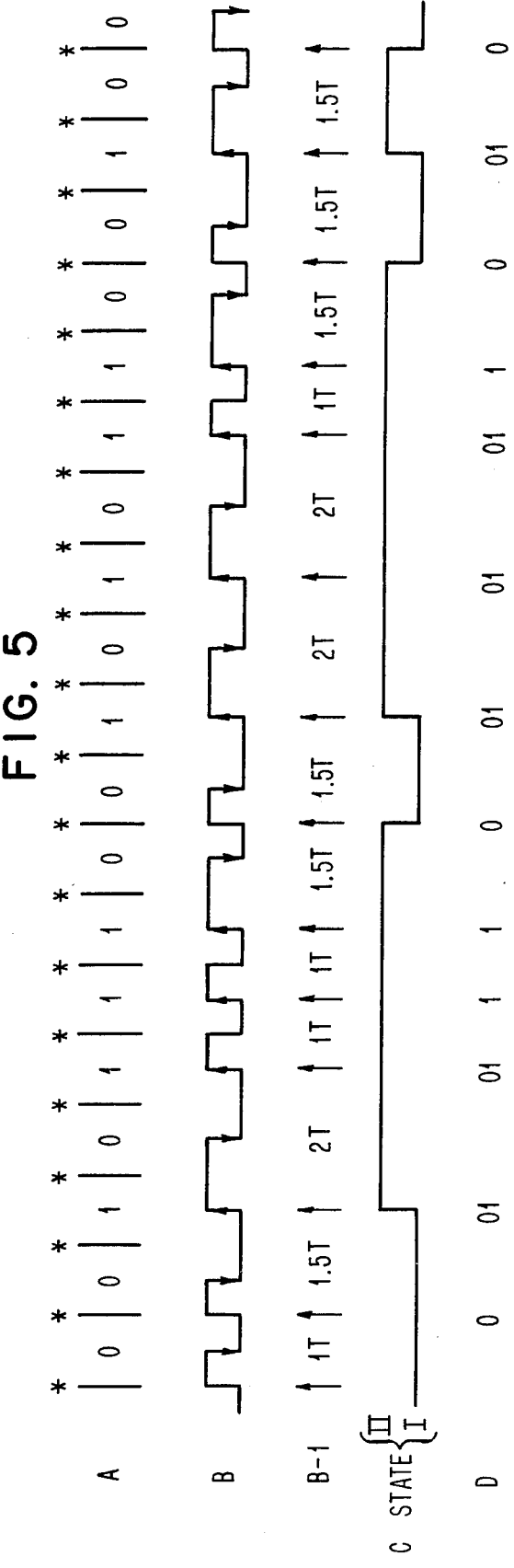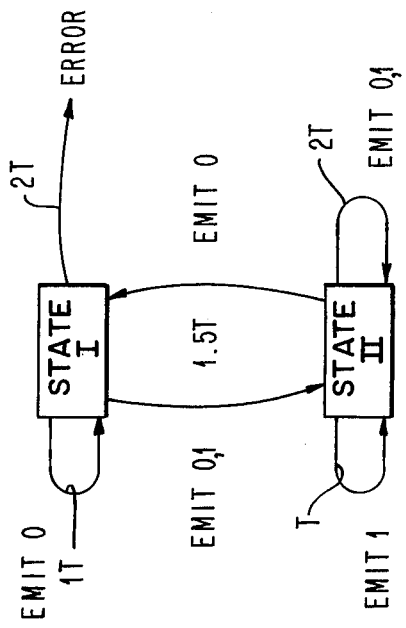
FIG. 5
FIG. 6

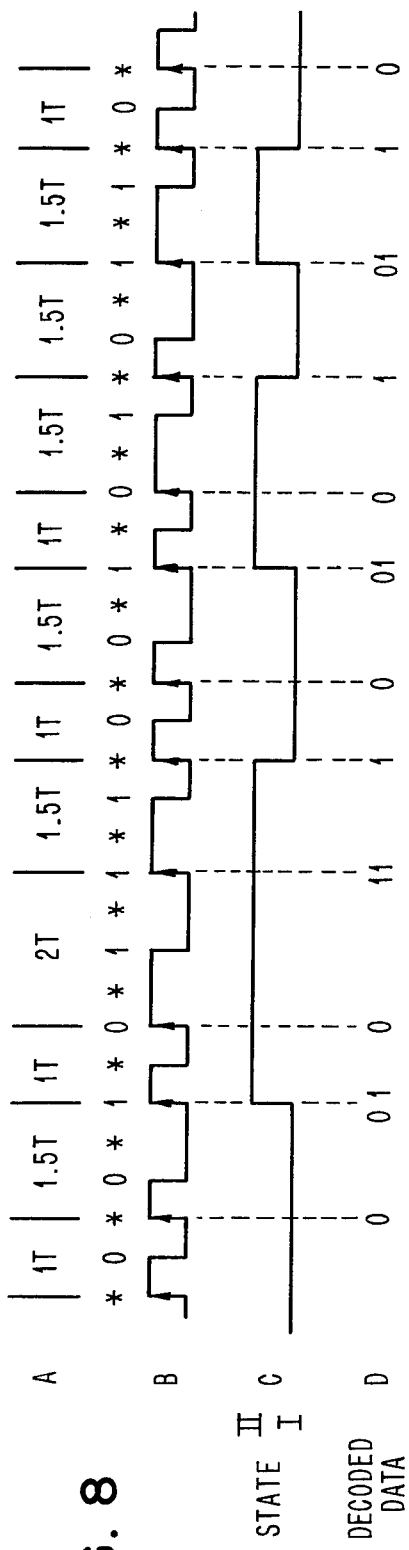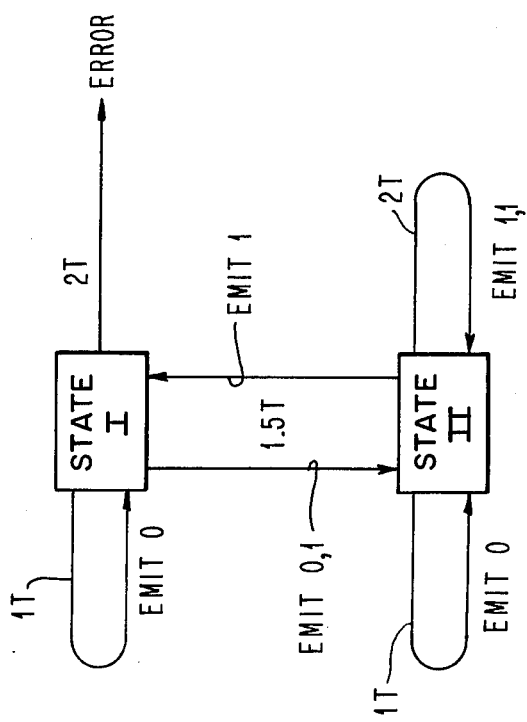
FIG. 8
FIG. 9

METHOD OF DECODING DATA CONTENT OF F2F AND PHASE SHIFT ENCODED DATA STREAMS

FIELD OF THE INVENTION

This invention relates to self clocking codes and to a code reading technique in general. More specifically it relates to the self clocking codes particularly known as F2F and phase shift codes and to a method for interpretating such code waveforms.

PRIOR ART

Numerous techniques and devices have previously been developed for the purpose of decoding self clocking bar or transition signal codes of the F2F or phase shift type in magnetic, optical and electrical signal forms. The techniques of decoding these waveforms have generally been tailored specifically to the type of system being used.

Many of the prior art techniques involve steps of measuring or detecting specific signals and/or a distance incorporated in the code of deriving clock signals, synchronization information, and data. One approach for a specific bar code, but which could be a general code reading technique, utilizes a leading edge to leading edge and/or trailing edge to trailing edge measurement for the bars in the code stream and then defines data content of the code according to the relative sizes of the measurements as compared to a reference distance or measurement contained in each code character. Such a technique may be found in U.S. Pat. No. 3,723,710 for example. However, this technique requires that a reference distance or space be incorporated in each string of code bits or in each character. Furthermore, all of the spacings in the code stream or in each character must be measured and compared to find out which of the spacings is the reference. Remaining measurements are then compared against the reference to categorize the leading to leading edge distances in terms of the reference and the trailing to trailing edge distance in terms of the reference so that the code may be decoded.

This is a powerful technique, but it has several undesirable features. First, the entire sequence of code transitions, however long, must be scanned and measured; then the reference spacing or measurement must be isolated from among the group of measurements taken; then the remaining measurements must be categorized in terms of the reference, and finally the data may be decoded in accordance with the relative measurements discovered. This technique is subject to accelerative or other types of frequency distortion in the basic signal input so that over a long string of data bits, the relative sizes of the transitions or spacings may become distorted sufficiently that some confusion as to the actual sizes as compared to a reference or even to the identity of the reference spacing itself may occur. Secondly, the technique requires that all of the spacings must be measured first and processed later. If a transition is inadvertently missed, its absence is not detected until the time that processing occurs. It would be more advantageous to detect errors at the bit level or at the pulse level as soon as they occur or are detected in the signal stream.

Various techniques have been developed for isolating individual pulses in the signal stream presented for decoding and the prior art is replete with examples of circuitry and technique for doing this. In general, these techniques involve setting up a search gate at an appropriate time to look for the occurrence of a pulse within the gate which is indicative of the data content of a bit cell. Some such techniques are quite powerful but are limited to the code being decoded. For example, U.S. Pat. Nos. 3,723,710, 3,708,748, 3,886,521, or those in copending applications Ser. Nos. 522,210, filed 11/8/74 and now abandoned 538,272, filed 12/31/74, now U.S. Pat. No. 3,947,662 546,572 filed 2/3/75, now U.S. Pat. No. 3,969,613 and 546,842 filed 2/3/75, now U.S. Pat. 3,959,626 and in particular 626,680 filed 10/29/75, now U.S. Pat. No. 3,978,319 are of interest.

Some of the code reading techniques in the prior art utilize a reference measurement or character or a set of transitions prior to each and every separate string of data bits and a good deal of attention has been focused, as noted by the aforementioned co-pending applications, on techniques for setting up search gates and decoding various types of self clocking code streams.

OBJECTS OF THE INVENTION

In light of the foregoing proliferation of techniques and problems encountered in the field, and of the shortcomings in the known prior art, it is an object of this invention to provide an improved, compatible self clocking code reading technique for the F2F and phase shift codes which utilizes the positive to positive or negative to negative signal transition spacings as indicia of the code content.

SUMMARY OF THE INVENTION

The technique of the present invention comprises steps of detecting a positive going (or negative going) signal in an F2F or phase shift signal stream presented for decoding. This is followed by detecting the next following like polarity signal to that detected in the first step; then the distance between the two like polarity pulses which have been detected is characterized in terms of the natural occurring minimum, intermediate and maximum spacings possible in such a code stream. That is, the transitions may be 1 symbol width apart, 1.5 symbol widths apart, or 2.0 symbol widths apart. Lastly, the data content of that portion of the signal stream bounded by the two like polarity pulses is decoded in accordance with the relative size of the interval detected between said two pulses.

BRIEF DESCRIPTION OF THE DRAWINGS

FIG. 2a illustrates a logical matrix for the interpretation convention used to decode the data content as indicated in Line A of FIG. 1.

FIG. 2b is illustrative of a table of logical matrix values to be decoded for the interpretation convention used to decode the data content as indicated in line B of FIG. 1.

FIG. 5 illustrates an example of a phase shift coded signal.

FIG. 6 illustrates a decode convention and state change convention for decoding phase shift two frequency code using the method of the invention.

FIG. 8 illustrates another example of a phase shift encoding and decoding technique.

FIG. 9 illustrates a decoding state diagram for the decoding technique of FIG. 8.

A detailed description of a preferred embodiment of the invention, together with examples of its application to F2F or phase shift waveforms will now be given. However, at the outset, reference will be made to a co-pending application Ser. No. 626,680, now U.S. Pat. No. 3,978,319 filed Oct. 29, 1975, and assigned to the common assignee with the present application. The reference co-pending application illustrates appropriate demodulator circuitry for providing timing outputs to isolate pulses occurring in an F2F or similar code stream at spacings identified as 1.0, 1.5, and 2.0 times the nominal cell or 1F transition to 1F transition width. Other devices or circuits may be equally useful, and it will be assumed at the outset that such circuitry is provided and that the code streams will be analyzed by such circuitry and that the present invention will be provided with indications of where the pulses in the code stream are occurring, i.e., whether pulses of like polarity are occurring at 1, 1.5, 2.0 times the normal 1F signal transition spacing T, otherwise known as the bit "cell width", "symbol width", etc.

Figure 1:
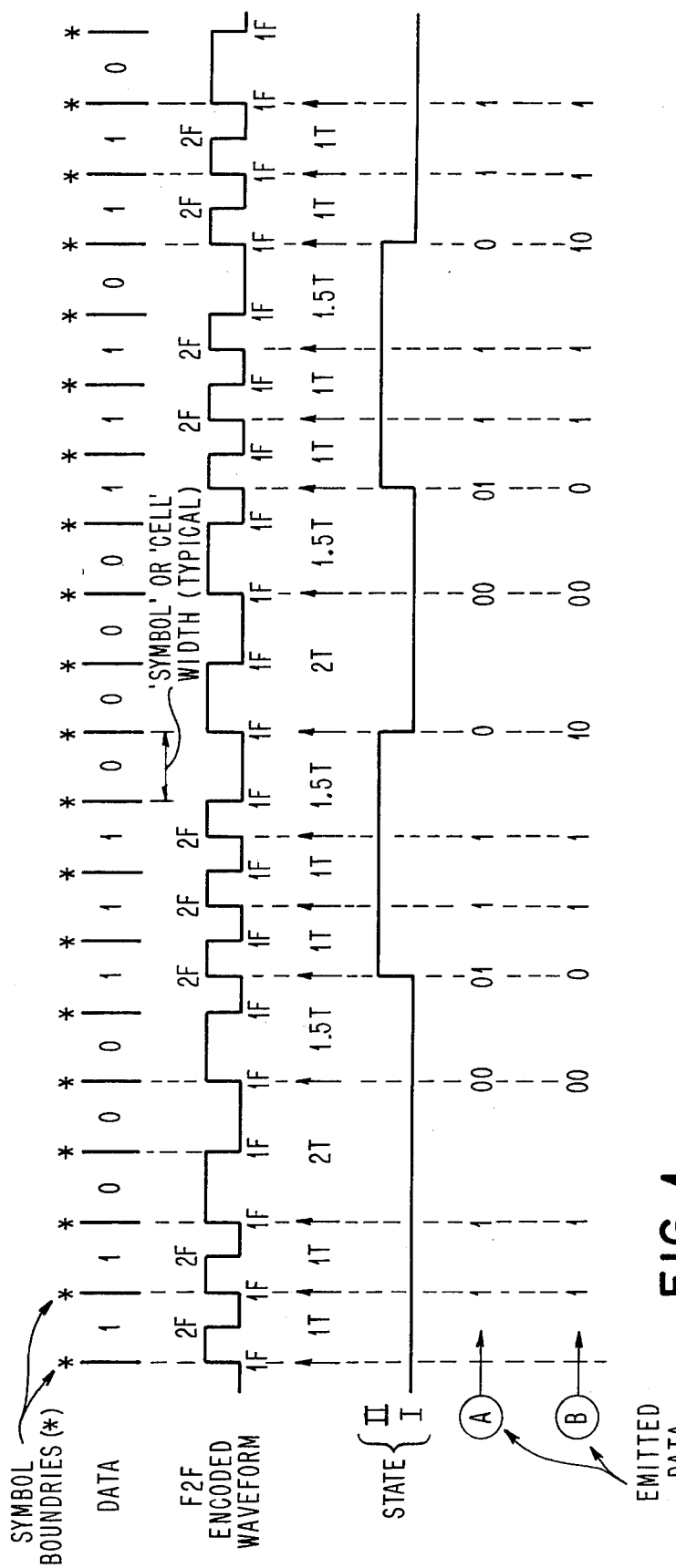
FIG. 1 illustrates a representative example of F2F data as it would appear encoded according to the usual convention in which a transition occurring between the 1F frequency points is indicative of a data bit 1 and the absence of such a pulse is indicative of a data bit 0. The transition points which are the cell or symbol boundaries are indicated by asterisks and the data content of the cells is shown also.

The terms "1F", "2F", "cell width", etc. are well known in the art of F2F encoding and decoding techniques and a typical example identifying these terms is illustrated in FIG. 1, where F2F data, encoded with the usual convention, is illustrated as a stream of ones and zeros represented as signal transitions occurring in time with intermediate transitions sometimes occurring at the 2F frequency. It will be observed that the interval between like polarity pulses at the leading or at the trailing edge of bars or spaces in the code stream of FIG. 1 are spaced apart at intervals T, 1.5T or 2T, these being the only combinations that can be made using 1F and 2F signal transitions in the code stream.

Written above the signal stream of FIG. 1 are the data contents of the various bit cells. Bit cells are identified in the line above the code stream as a series of evenly spaces segments of the waveform of nominally uniform width T between the symbol or cell boundaries. In the lines below the waveform of FIG. 1 are two alternative lines of code contents, identified as lines A and B respectively, which can be decoded according to the present invention according to conventions chosen as will appear later.

The representative stream of F2F signals in FIG. 1 has been drawn with small arrows indicating the occurrence of positive going transitions. It will be assumed that some suitable demodulator circuit such as that in the aforementioned co-pending application Ser. No. 626,680, now U.S. Pat. No. 3,978,319 for example, has been provided and that signals will be received from such a circuit to indicate to a decoder the time or distance found to exist between consecutive like polarity signals, such as illustrated in FIG. 1 by the small arrows as occurring at T, 1.5T, or 2.0T, where T is the nominal cell or bit width in an F2F data stream.

A distinction is drawn between "demodulation" and "decoding" as used herein. Demodulation refers to the process of surveying an incoming signal waveform and isolating from it for output the significant elements and their frequency of occurrence (or spacing), polarity, etc. Decoding, on the other hand, refers to the process of interpreting data meanings from the output indications of a demodulator.

Turning to FIG. 2a a chart is given in which, according to whether the interval between succeeding like polarity transitions is T, 1.5T or 2T, the data output of a decoder and instructions as to which state of decoding to remain in, according to the present invention, are given. FIG. 2b illustrates another similar chart according to a second encoding or decoding convention as will be discussed, and is similar to FIG. 2a.

Given an F2F encoded bit stream, such as is illustrated in FIG. 1, a problem often arises in attempting to decode the data in the presence of certain forms of distortion, notably known for printed media as "print spread". As it occurs, print spread normally is associated with the spreading of ink in printed black bars of given width outward from the area in which they were orginally laid on the media. In an F2F code stream of printed bars and spaces, the effect is that the leading and trailing edges of bars grow, or the width of the bars increases and the intervening space is appropriately decreased. Spread distortion of this type typically adds a constant increment of increased width to all leading and trailing edges in a time varying waveform.

It has been recognized in the aforementioned U.S. Pat. No. 3,723,710 that, given relatively constant spread, the distance from one leading edge of the next leading edge (or from trailing to trailing edges) in the waveform will be the same as in the undistorted waveforms without print spread. Thus, if data is contained in an F2F waveform and can be decoded using only the leading to leading edge or the trailing to trailing edge distances, the spread distortion will have no net effect and can thus be ignored.

The present invention describes a technique for decoding any F2F waveform using only the leading edge to leading edge distances or the trailing edge to trailing edge distances measured in the waveform. It will be assumed that all of the leading edges, as indicated by arrows as illustrated in FIG. 1, will be positive going signal transitions, but negative transitions could be used instead. Assuming that a constant velocity scan operation is conducted on a printed F2F code or that a constant velocity input of signals is provided to a demodulator, the minimum time between the successive positive going transitions may be defined as T, the cell, bit or symbol width inherent in an F2F code. The minimum time T corresponds in the example shown in FIG. 1 to a one bit in which two 1F frequency transitions or positive going transitions are interspersed by one 2F frequency transition. If the distance between successive positive going transitions happens to be two times the minimum spacing T, then a pair of zero bits would be indicated according to the usual convention which indicates that a zero bit is encoded by the absence of a 2F transition between two 1F transitions. Finally, if the time between two adjacent positive going transitions happens to be 1.5T, one of two possible things may be indicated:

1. Either a zero bit and one-half of a one bit are indicated or one-half of one bit and a zero bit are indicated, with the order of indication being important. A rule for determining which indication should be interpreted must be devised.

According to the present invention it has been decided that if the last positive going transition falls other than on a symbol boundary identified as a 1F transition point, then a zero bit and one-half of one bit are to be indicated. 2. Secondly, if the last positive going transition falls on the 1F or symbol boundary then one-half of a one bit and a zero bit will be outputted.

Since the time between two like transitions of 1.5T may have either of these two meanings, two decode states are implied. These decoding states will be called State 1 and State 2 and will be defined as follows:

State 1 is entered whenever a positive going transition occurs on a symbol boundary (i.e., on the 1F transition point as identified in FIG. 1). Secondly, State 2 will be entered whenever a positive going transition occurs between, but not on, the 1F symbol boundaries. Turning to FIG. 2A the states and the decode meanings are summarized for the various signal to signal transition times that are possible for both states and the rules for entering and exiting from a State 1 to a State 2 decode condition are also given.

Figure 3:
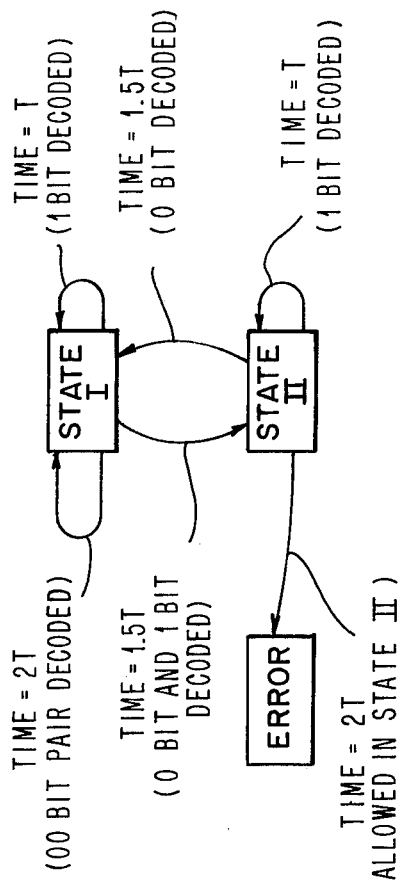
FIG. 3 illustrates a state diagram for decoding the waveform such as ilustrated in FIG. 1 (line A) which shows the change of state from a state 1 decode operation to a state 2 decode operation.

FIG. 3 illustrates a State diagram with the decoding rules to be applied to waveforms of the F2F type depending upon the interval of time detected between successive like polarity pulses or signals in the waveform.

In the chart of FIG. 2A, a rule has been arbitrarily chosen so as to emit a 01 dibit of information upon detection of 1.5T interval spacing when State 1 is in existence during the decode operation and to emit a 0 bit upon detection of 1.5T interval while in State 2. In Chart 2B the alternate convention is illustrated in which it is chosen to emit a 0 bit upon detection of a 1.5T interval during a State 1 decode condition and to emit a 10 dibit upon detection of the 1.5T interval while in State 2. As indicated in the example shown in FIG. 1 in lines A and B, either of these conventions will lead to the correct decode of the same information as contained in the top line of FIG. 1. The F2F code inherent in the example of FIG. 1 can be accurately decoded using only the known intervals of space between like polarity transitions which have been detected by a suitable detector and demodulated and presented to the decoder.

Figure 4:
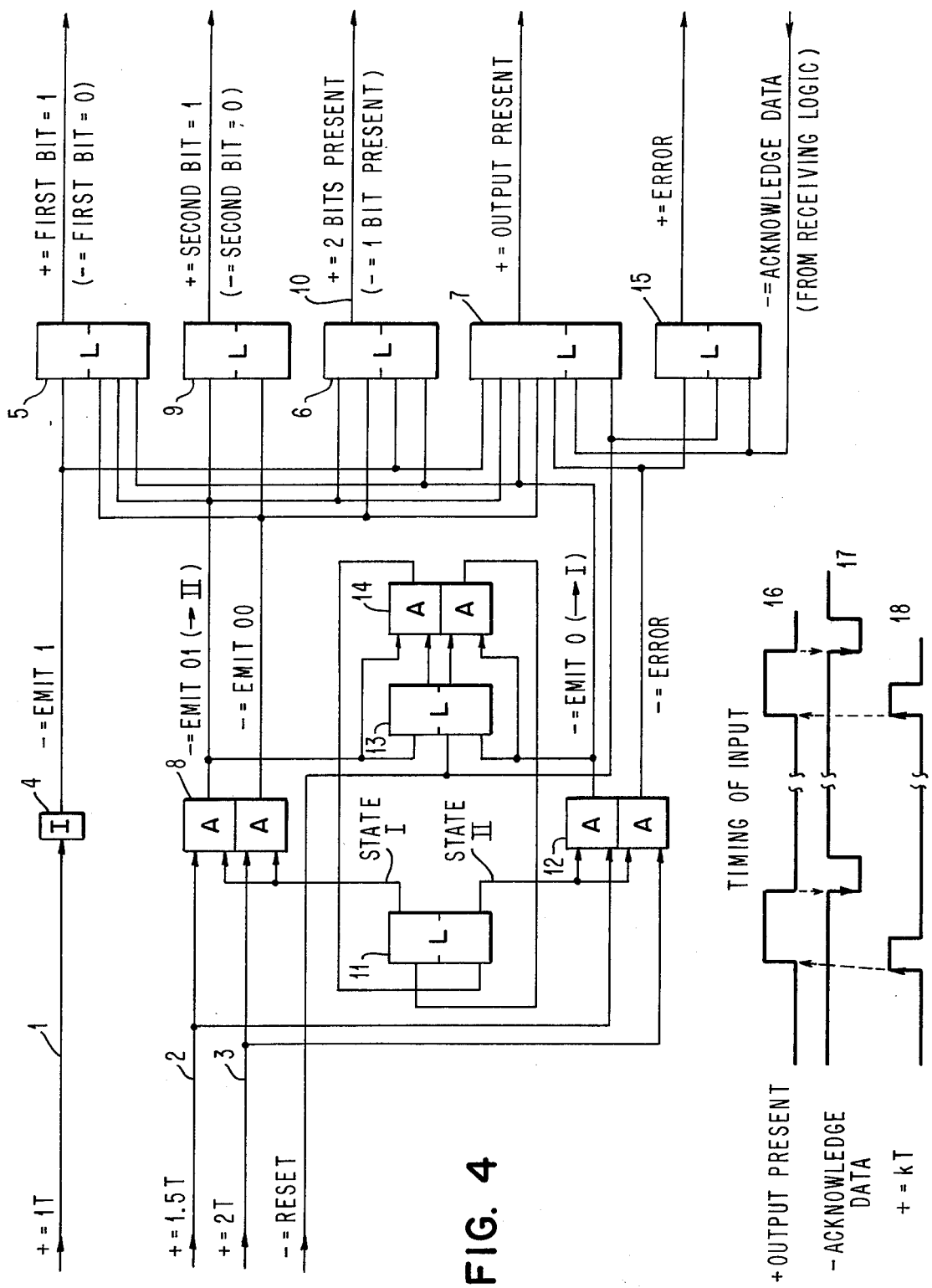
FIG. 4 illustrates a decoding circuit for decoding the data signals in accordance with the invention.

FIG. 4 illustrates one form of a logic system for decoding the F2F data in accordance with signals presented from a primary sensor and demodulator which provides information as to the detection of like polarity transitions at 1, 1.5 or 2.0 times the nominal interval or bit spacing.

The inputs in FIG. 4 are presumed as coming from a suitable demodulator having detection and isolation circuits, such as, for example, that in the aformentioned co-pending application, Ser. No. 626,680 now U.S. Pat. No. 3,978,319, which indicates the occurrence of like polarity pulses as being spaced at 1, 1.5 or 2.0 times the nominal bit spacing in an F2F code stream as understood in the art.

Turning to FIG. 4, an embodiment of the F2F decoder built to recreate the output decode pattern of FIG. 2A is illustrated. Incoming signals on lines 1, 2 and 3 would be timing indications coming from a demodulator and signal detector, such as a suitable scanner or receiver, which will have categorized the signal time occurrences between like polarity transitions to be equal to 1, 1.5 or 2.0T, where T is the basic width of an F2 F symbol. T is the minimum width between two 1F signal transitions in an F2F signal stream. Apparatus of this type for providing output signals indicative of finding a pulse at 1T, 1.5T or 2T has been previously described in the aformentioned U.S. Pat. application Ser. No. 626,680, now U.S. Pat. No. 3,978,319, but other circuits for detecting the polarity of signal transitions in an F2F signal stream and for categorizing the spacings between two like transitions as equal to the foregoing increments of time or distance would be suitable for providing this input signal to the decoder in FIG. 4 on lines 1, 2 and 3, respectively.

The input on line 1, indicative of a spacing between two like polarity transitions as equal to 1T, (that is, equal to the minimum space between two 1F transitions in an F2F signal stream) is applied to inverter 4 which drives the output of inverter 4 negative and this is applied to set the latch 5 to drive its output positive to indicate that the bit of data contained between the last two signal transitions is a 1. The negative output from inverter 4 is also applied to reset latch 6 and set latch 7. Latch 6 is reset to provide an indication that only a single bit of data is present for output to the using system. At latch 7 the output is raised to indicate that there is an output present so that the using system can strobe the output latches 5, 9 and 6 to determine the number of bits and their identity that have been decoded thus far.

The 1.5T spacing signal, if it occurs, is applied on line 2 to double AND gates 8 and 12 which are activated by other inputs from the state condition latch 11 as will be described further below.

The state condition latch 11 keeps track of whether the decode operation should be conducted in state 1 or state 2 as illustrated in FIG. 2A, for example. Normally, at starting up the decode operation, a reset signal is applied to latch 13 as illustrated setting the output to AND gate 14 positive. The other input to AND gate 14 would come either from AND gate 8 or 12, both of which, in the absence of incoming signals on their appropriate lines 2 or 3, would be positive at the output side, thus fully conditioning AND gate 14. However, as noted the reset line is applied to latch 13 to set only that half of double AND gate 14 to the output condition which sets the latch 11 to the state 1 condition. Therefore, at the start of reading a new stream of data, the reset is pulsed and applied to latches 7, 13 and 15, thus preparing the decoder to begin operating on a new received data stream.

Returning now to the condition which exits when the output from AND gate 8 goes negative, it will be observed that the inputs to latch 13 and AND gate 14 will both go negative. When the input from AND gate 8 to latch 13 goes negative, latch 13 will be set. The AND gate 14 having an input coming from AND gate 8 will be partially enabled, the not totally, until the end of the timing pulse coming in on line 2. At this time, the output from AND gate 8 will go back to positive, fully conditioning AND gate 14 and applying an output to set state latch 11 to state 2, as is consistent with the decode matrix diagram in FIG. 2A. The positive level of signal applied at the input to latch 13 will not change its state since it requires a negative going signal to be set.

The state latch 11 will remain in state 2, which has the effect of disenabling the AND gates 8 and enabling AND gates 12. If a pulse should appear on line 2, AND gates 12 are then fully conditioned and an output, a negative going signal, will be applied to the latch 13 and AND gates 14. At the end of the pulse being applied from line 2, the state latch 11 will be reset to state 1 as shown in the schematic diagram of FIG. 4.

In the event that a pulse should appear on line 3 while AND gates 12 are fully conditioned, this is the non-allowed or not-occurring decode condition and an error signal will be indicated at the output of AND gate 12 which is applied to latch 7 and to latch 15 to indicate that there is an output and that there is an error present so that the using system, now shown, can take appropriate action.

The normal outputs from AND gates 8 and AND gates 12 are used to indicate to their appropriate output latches the condition of emitting a 1, 01, 00 or a 0 and a change to decode state 1 or 2, respectively, as indicated in the diagram.

Several signal condition lines 16, 17 and 18 are shown as a representative timing chart for the operation of the decoder apparatus illustrated schematically in FIG. 4. Line 16 is the "output present" condition state which is raised during the time a T signal is present as illustrated in line 18; this must be ended prior to the next T signal on line 18 by the negative "system acknowledge" signal on line 17, normally provided by feedback from the using system as a form of acknowledgement signal saying the last bit(s) of data was received. This would take the form of a negative going pulse occurring at some time before the next positive going T signal. This is shown in line 17 as the signal which will be supplied by the using system, for example, and it will be understood that other suitable clock means for producing this signal to cut off the "output present" signal in line 16 could also be provided. The negative edge of the signal on line 17 is utilized to reset latches 7 and 15 as shown in FIG. 4. Line 18 illustrates the T signal which would actually be produced by a scanner scanning an F2F code (and later demodulated) and it should be understood that the T signals would appear variably spaced in time depending on scanner velocity conditions, etc. and are shown here on line 18 only as representative examples.

Turning now to FIG. 5, a comparison between F2F and phase shift two frequency code will be made and then the decode conventions to decode phase code of this type, as illustrated in FIG. 6, will be discussed. Later, an example of a decoder embodiment will also be described for use on this type of code using the same decoding method as for F2F codes.

Turning to FIG. 5, another type of code similar to F2F, but utilizing the phase change of the signal is illustrated. Line A of FIG. 5 depicts the symbol or cell boundaries of this signal stream, intermediate which are written the encoded data contents according to the convention normally used in phase code. In line B is shown a waveform encoded with the phase code data of line A and in which it can be seen that a transition in level from up to down or from down to up intermediate cell boundaries is indicative of the data. The convention chosen in line B to depict the zeros as the transition from up to down, (or a down going pulse) is indicated by the arrow line in line B, while a 1 is indicated by a positive going pulse in line B at the center point of each cell. Line C illustrates a decoding change of state pattern for decoding this code according to the present invention. Line D illustrates the decoded data which would result using the decode method of the present invention and it may be seen that this is the same data contained in line A of FIG. 5. Line B-1 illustrates the transition to transition spacings inherent in line B from which the decoded data of line D results.

Figure 7:
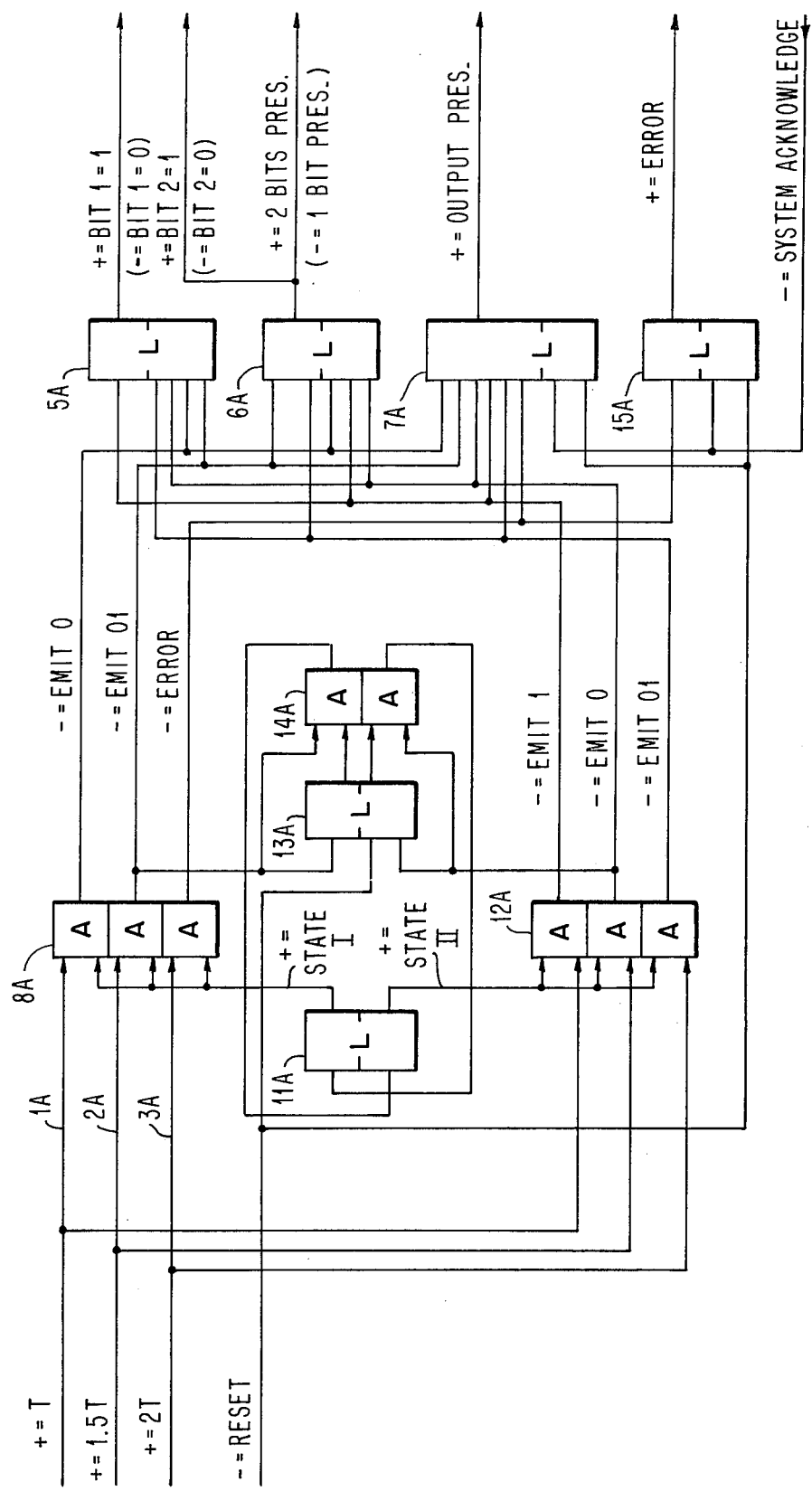
FIG. 7 illustrates an embodiment of a decoding circuit for decoding the data encoded in phase shift format in accordance with FIGS. 5 and 6.

FIG. 6 illustrates a decoding state diagram and rules for outputing the data decoded, utilizing the method of the present invention. FIG. 7 shows an embodiment of the circuit meant to follow the rules of FIG. 6 for decoding phase encoded data. The structure and operation of the circuitry in FIG. 7 is similar to that of FIG. 4 utilized for F2F data, however, additional AND gates are required as illustrated by AND gates 8A and 12A.

In FIG. 7, various components and signal lines are labeled with numbers parallel to those in FIG. 4, but with the suffix A. The operation is similar to that given for FIG. 4 and is easily understood from FIG. 7 itself. As with FIG. 4, the final output indications from the various latches indicate the appropriate number of bits and identity as one or zero bits with the convention arbitrarily chosen that an up level or positive signal indicates a one bit while the zero or negative level indicates a zero bit.

FIG. 8 illustrates another type of phase code which may be encoded with a slightly different encoding invention but which may be decoded according to the same method as the present invention.

In FIG. 8, line A illustrates the interval of time between positive going transitions in line B, the phase encoded waveform that would be received for demodulation and later decoding. Also shown in line A by asterisks are the locations of the symbol or cell boundaries. Line B illustrates the waveform and line C illustrates the change of decoding state between state 2 and state 1 that would be required to decode line B using the present technique.

Line D illustrates decoded data that could be decoded using the present invention where the phase code of line B has been encoded with the following convention:

In line B, if the state (voltage level) of a cell (defined by asterisks in line A), i.e., the change in voltage level from up to down, is the same as it was in the previous cell it will be presumed to indicate a zero, while if the change of voltage level in a given cell is not the same as it was in the last cell, a one will be indicated.

FIG. 9 illustrates the data output and change of state diagram associated with FIG. 8 and the encoding, decoding convention used therein. As will be noted by comparing FIG. 8 with FIG. 5, different data maybe incorporated using the same type of waveforms, but may be interpreted using the same method as the present invention where the interval between like polarity pulses is identified and categorized as equal to T, 1.5T, or 2T and then, according to which state of decoding the decoder is in, the data bit output may be determined.

ADVANTAGES

What has been described in the preferred embodiment is a method of decoding F2F or phase shift waveforms utilizing only the positive to positive edge transition distances or alternatively, the negative to negative edge transition distances. This results in an insensitivity to print spread, which may be a problem in printed F2F codes, and performs the decoding operation with a minimum of logic and circuitry since only a single channel, i.e., single polarity pulses are needed.

Having described the invention in terms of a preferred embodiment thereof, it will be understood by those of skill in the art that many changes in the specific circuits utilized in the preferred embodiment of the decoder apparatus could be made without departing from the scope and spirit of the invention or in the technique involved in decoding the code and embodied in the apparatus as shown.

What is claimed is:

1. In a decoder apparatus having logic means for comparing signal indications from a demodulator and also having at least two alternative decode value tables called states in which data contents may be interpreted in accordance with said indications from said demodulator, a method of decoding the data contents of F2F or two phase shift encoded data streams which have been demodulated in a demodulator to extract the characteristic 1F and 2F frequency pulses contained in such codes and between which pulses said demodulator has performed measurements and comparisons to characterize the intervals of time or distance contained between each pair of like polarity pulses as being equal to 1T, 1.5T, or 2T, where T is the nominal minimum distance or time normally occurring between two 1F pulses in said codes, said decoder also being provided with an indication of the type of code to be decoded and with the indications of the results of said interval characterization from said demodulator, the method of selecting a decoding state in said decoder and decoding said data contents in accordance with said interval indications comprising steps performed in said decoder of:

controlling the decoding state of said decoder in accordance with said interval indication received from said demodulator for the two most recently received like polarity pulses in said encoded stream of data;

selecting a set of possible data contents for the portion of said code stream encompassed by said two most recently received like polarity pulses in accordance with said decoding state of said decoder; and selecting and outputting the particular data content from said set of possible data contents in said state in accordance with said interval indication, thereby decoding the portion of said code lying between said two last received like polarity pulses.

2. The method of claim 1, wherein said controlling step further includes:

changing said decoding state from one state to another after each indication of an interval equal to 1.5T.

3. The method of claim 1, wherein said selecting and outputting step further comprises:

outputting two data bits whenever said interval indication is 2T, outputting a single data bit whenever said interval indication is 1T, and outputting one or two data bits as determined by the state of said decoder, whenever said interval indication is 1.5T.

4. The method of claim 2, wherein said selecting and outputting step further comprises:

outputting two data bits whenever said interval indication is 2T, outputting a single data bit whenever said interval indication is 1T, and outputting one or two data bits as determined by the state of said decoder, whenever said interval indication is 1.5T.

5. The method of claim 1, wherein said selecting and outputting step further comprises:

outputting an error indication signal and no data bits whenever said interval indication is 2T and one of said decoding states selected according to a chosen convention coexist.

6. The method of claim 2, wherein said selecting and outputting steps further comprises:

outputting an error indication signal and no data bits whenever said interval indication is 2T and one of said decoding states selected according to a chosen coding convention coexist.

7. The method of claim 3, wherein said selecting and outputting steps further comprises:

outputting an error indication signal and no data bits whenever said interval indication is 2T and one of said decoding states selected according to a chosen coding convention coexist.

8. The method of claim 4, wherein said selecting and outputting steps further comprises:

outputting an error indication signal and no data bits whenever said interval indication is 2T and one of said decoding states selected according to a chosen coding convention coexist.

* * * * *